Patented Aug. 6, 1940

2,210,857

UNITED STATES PATENT OFFICE

2,210,857

BAKERY COMPOSITION

Robert L. Lloyd, Laurelton, N. Y., assignor to American Maize-Products Company, a corporation of Maine No Drawing. Application October 15, 1938, Serial No. 235,222

9 Claims. (Cl. 99—92)

My invention relates to bakery products and more particularly to cakes and the like which employ relatively large amounts of sugars.

Prior to the recent development of more fully hydrogenated vegetable oil fats for use in bakery products, the quantity of sugar that could be used was restricted generally to an amount not substantially greater than the amount of shortening used, which in the usual case was approximately the same as the amount of flour used. That is, the usual maximum sugar content was about 100% of the flour or shortening content. The more recent use of more fully hydrogenated fats, however, has enabled the amount of sugar to be increased, so far as the physical admixture is concerned, to a proportion of about 140% of the flour used. These so-called high percent sugar mixes may improve somewhat the physical characteristics of the cake or other bakery product; but they have the known disadvantage of making the product too sweet. Reduction in the sugar (sucrose) content would diminish sweetness but would likewise diminish the keeping quality and texture and tenderness of the cake, and the use of sugar syrups in large amounts is unsatisfactory because of the physical difficulties of blending the viscous, sticky syrup with the dry flour and shortening.

Whatever the amount of sucrose used as the sugar ingredient in cakes, it has the undesirable feature of drying out, that is, losing its contained moisture to the atmosphere, during storage and shipment of the cake. For that reason the cake seller cannot keep cakes on the shelf more than about three to five days time. If they are not sold during that period they must be returned to the manufacturer to be discarded or sold as stale cake, resulting in great losses to the baker and causing higher average prices for fresh cake.

Another disadvantage of the use of large amounts of sucrose in cakes is that it does not provide a crumb with cell walls of minimum thickness desired in cakes to produce the proper grain and texture and to make them light; that is, it does not emulsify with air efficiently to effect maximum volume in the cake. Because of this defect it is necessary to use relatively large amounts of leavening agents, such as baking powder. This has a decided disadvantage in that the large amount of baking powder causes the cake to dry out very quickly so that it has an undesirable short shelf life. Furthermore, as is well known, the baking powder has a bitter taste and when present in large amounts in the cake it will give the cake an undesirable bitter taste.

In accordance with my invention I have discovered a means that overcomes all of the above disadvantages incurred with the use of sucrose and permits the use of unusually large amounts of sugar content without increasing the sweetness of the bakery product, and in fact actually decreases the undesired sweetness even when the total sugar content is substantially higher than the maximum amounts heretofore used. This means involves the use of a form of cereal sugars obtained for example, by drying corn syrup to a relatively low and stable moisture content and comminuting the solidified mass, thereby producing a dried, powdery material which may replace in whole or in part the sucrose normally used in cakes and the like. This dried material contains less than about 4% moisture and usually about 2% to 3% moisture. When dehydrated to this point the material is sufficiently non-hygroscopic to permit handling and shipment without vacuum sealing as contrasted with the highly hygroscopic corn syrup from which it is obtained. Several different procedures for preparing the dried cereal sugars product useful in this invention are disclosed in the following copending applications: Ottomar Wolff application Ser. No. 196,899 filed Mar. 19, 1938; Ottomar Wolff application Ser. No. 197,423, filed Mar. 22, 1938; and James F. Walsh application Ser. No. 163,257, filed Sept. 10, 1937.

The above application Serial No. 196,899 discloses a substantially dry, storable, solidified starch conversion syrup, the hygroscopic properties of which are kept to a satisfactory minimum by limiting the conversion of the syrup to be dried to a reducing sugars content of about 27% to 32%.

The application Ser. No. 197,423 discloses a method of producing a substantially dry, storable solid starch conversion syrup product by blending a converted starch liquor of high reducing sugars content and of minimum hygroscopic properties with a converted starch liquor of low reducing sugars content also having minimum hygroscopic properties, to produce a mixed liquor of intermediate reducing sugars content and drying the mixture.

The application Ser. No. 163,257 discloses a process for producing a solidified starch conversion syrup product capable of being packaged and stored without caking by cooking a starch conversion liquor down to a relatively low moisture content and quickly solidifying the concentrated liquor by depositing in the form of a thin film on a chilled surface.

Any of the above three methods or other similar suitable methods may be used for preparing the solidified starch conversion syrup employed in the present invention, and as described more in detail in the above applications the starch conversion syrup, which is subsequently solidified may be obtained by conversion of corn or other suitable amylaceous materials such as potatoes, beans and peas. In addition to the methods of preparing the solidified starch conversion syrup described in the foregoing applications, other methods have been known and described over the course of many years.

This dried sugar material, which is in reality a dried, starch conversion syrup product, is non-efflorescent and therefore does not give up, on standing, its final moisture content. Accordingly, when this material is used in cakes, its retained moisture will keep the cake fresh and palatable over markedly long periods of time as compared with the regular sucrose sugar cake that dries out and becomes stale in about 3 to 4 days. The moisture content of 2%–4% in the dried sugar material used in this invention is not lost in view of the fact that the material is somewhat hygroscopic and is non-efflorescent which insures always a certain amount of moisture present in the cake to keep it fresh and prevent it from drying out. In view of this fact it is not necessary to use any moisture generating agent in the cake formula, such as invert sugar, whereby the cake manufacture is simplified and made less expensive.

The cereal sugars, or dried starch conversion syrup product, may vary widely in their composition. They consist primarily of dextrins and the reducing sugars, maltose and dextrose. The proportionate amount of these ingredients will vary in accordance with the degree of conversion of the starch syrup. The reducing sugar content calculated as dextrose may vary for example from about 15% to about 65% the remainder being primarily dextrins. At the low conversion end the dextrins will predominate and in all cases some appreciable amount of dextrins will be present in the cereal sugars. I believe that these dextrins play an important part in the efficient functioning of the cereal sugars product in my invention. The product as used in cake baking in accordance with my invention is in the form of a comminuted substantially dry, non-crystalline solid known in the trade as "Dri-Dex." This material is easily blended with the flour, shortening, eggs and other constituents used in the bakery product. A presently preferred form of Dri-Dex for use in this invention contains approximately 15% dextrose, 43% maltose and 42% dextrins.

One of the important features of the use of this Dri-Dex in my invention is the ability of this material to impart greater and more even porosity and extensibility to the cake batter and finally baked product, providing a crumb of proper grain and texture and characterized by cell walls of minimum thickness. I have found that by using "Dri-Dex" in conjunction with sucrose normally used in cake formulas, that markedly greater volume in the bakery product will be obtained without detriment to the grain and texture. The "Dri-Dex" is of such a nature that it will permit substantially greater quantities of air to be incorporated in the cake batter than is obtainable when using sucrose, that is, it functions efficiently to form an emulsion with air and the other cake ingredients. This of course is conducive to the desired effects of greater volume in the bakery product and a substantial improvement in the lightness of the cake since the specific gravity of the cake batter is materially reduced by the greater amount of incorporated air.

By virtue of this great emulsifying characteristic of the cereal sugars, that is, dried starch syrup, or "Dri-Dex," I have found that the quantity of leavening agent such as baking powder normally used in the cake formula can be remarkably reduced. For example, I have made very satisfactory cakes in which the amount of baking powder was reduced by approximately two-thirds of that normally used. In other words, when using the cereal sugars in accordance with my invention it is only necessary to use approximately one-third the amount of baking powder usually required. If it is desired to increase the volume of the bakery product substantially beyond that normally obtained this can be done by the use of the cereal sugars and either the same amount of baking powder or an amount somewhat smaller than that usually required. That is, the cereal sugars of this invention will augment greatly the leavening power of the baking powder or other leavening agent used in the cake.

Furthermore, by replacing a part or all of the sucrose by the cereal sugars in accordance with this invention I am able to increase the proportion of sugar content to that of flour or shortening substantially above any proportions that have heretofore been possible. As suggested, the maximum proportion of sugar to flour heretofore thought possible is approximately 140% of sucrose to 100% flour. When the cereal sugars are used in accordance with my invention, the total amount of sucrose and cereal sugars, which collectively may be identified as the sugar content may be as high as 200% by weight, of the amount of flour or shortening used.

The cereal sugars used in this invention have, per se, less sweetness in taste than sucrose, and where cakes or similar bakery products of not very great sweetness are desired the sucrose normally used in these products may be replaced entirely by the cereal sugars used in this invention. Where it is desired to maintain the usual sweetness or to decrease it only in part, a portion of the sucrose may be replaced by the cereal sugars. These cereal sugars have less sweetening effect in an alkaline medium than in an acid medium, which is generally of advantage in cakes since they usually have an alkaline pH. However, in the case of certain cakes such as fruit cakes, which usually have an acid pH the cereal sugars may be used and the desired sweetness still obtained since these cereal sugars enhance the natural sweetness of the candied fruits used in such cakes.

In a number of cases I have found that the ratio between the sucrose and cereal sugars may be varied from about equal proportions to proportions of about four parts of sucrose to one part of cereal sugars. As a specific example, if a formula now specifies 100# of total sugars, 20% may be replaced by twice that amount of cereal sugar, "Dri-Dex," and the resulting formula will specify 80# of sucrose and 40# of "Dri-Dex." In all cases however, the minimum amount of "Dri-Dex" necessary to obtain the entire advantages of this invention would be approximately 10% by weight of the total sugars. This amount or ratio between sucrose and "Dri-Dex" is dependent upon the type of cake desired and upon seasons of the year. In certain cases the maximum amount of "Dri-Dex" might be about 100% of the total sugar and a minimum of about 5% of the total sugars. In the usual case it will not be of advantage to use less than about 10% of "Dri-Dex" and not more than about 50% "Dri-Dex."

Two illustrative, but non-limiting examples of satisfactory formulas and procedures for making a sponge cake and a chocolate cake respectively, in accordance with my invention are as follows:

EXAMPLE I

Sponge cake

Formula:

| | Parts |
|---|---|
| Sucrose | 300 |
| Cereal sugars | 120 |
| Whole eggs | 360 |
| Salt | 10 |
| Water | 200 |
| Cornstarch (preferably non-acid) | 10 |
| Sucrose | 60 |
| Milk powder | 25 |
| Flour | 450 |
| $KHC_4H_4O_6$ | 8 |
| $NaHCO_3$ | 4 |

*Procedure.*—The 300 parts of sucrose and 120 parts of cereal sugars shown in the first group of ingredients in the above formula are blended in dry form. This may be done by sifting the two materials together. To this blend is added the 360 parts of eggs. If desired, egg yolks only may be used instead of the whole eggs or a blend of yolks and white. The salt is next added and the resulting mixture is now placed in a common form of rotary beater having a wire whip type of stirrer. The mixture is beaten for about 3 to 5 minutes until the full peak volume is reached, which can be identified from experience since if this point is passed the volume will begin to decrease. This beating action using the rotating wire whip form of stirrer produces what is apparently an emulsion of air, sugar and eggs.

I have found that the cereal sugars are highly desirable from the emulsion stand-point since they have a substantially greater capacity for forming an emulsion with air and the other cake ingredients than the usual sucrose. This will be quite apparent from comparative mixtures at this point, using only sucrose in one and in the other replacing the cereal sugars for a portion of the sucrose, the final volume obtained in the latter case being substantially greater than that in the former, and the specific gravity is definitely decreased.

While the above described mixing operation is going on the remainder of the sucrose shown in the second group of ingredients in the above formula is mixed with the milk powder and to this mixture is added most of the 200 parts of water. The water may be added hot or cold, but the final mixture is heated to boiling. The non-acid corn starch is mixed with the remainder of the 200 parts of water at room temperature to produce a uniform starch suspension without lumping of the starch. This cold water starch suspension is then slowly added and mixed in with the above described sucrose, milk powder and water mixture while boiling and this final mixture is heated to nearly the boiling point, and then the heating stopped.

The two mixtures described above resulting from mixing the first two groups of materials in the above formula, are then mixed together slowly with stirring. I have found it good practice to scrape down the material on the sides and bottom of the mixer at this point to effect good mixing. This mixing operation is continued preferably at low speeds until an intimate admixture is obtained. This usually requires not more than one minute's time.

The next step in the operation is to blend the flour and the leavening agent shown in the third group of materials in the above formula. It is to be noted that in this formula potassium tartrate and sodium bicarbonate have been used, but it is to be understood that any suitable form of baking powder or other leavening agent may be used. It is also to be noted that the potassium tartrate is present in an amount twice that of the sodium bicarbonate, which I have found to give good results.

The dry blend of flour and leavening agent is now mixed in with the final mixture of all of the other ingredients described above, and the resulting mixture is mixed sufficiently long to form a smooth batter. This can be done by hand or by machine, and it is to be noted here that the less mixing of the batter the better since the leavening agent begins to work as soon as it comes in contact with the water, and if the agitation at this point is minimized, the major effect of the leavening agent will be preserved until the product is in the oven.

The final batter described above is divided into various size units suitable for baking and these various units are baked at the usual sponge cake temperatures.

EXAMPLE II

Chocolate cake

Formula:

| | Parts |
|---|---|
| Cereal sugars | 300 |
| Sucrose | 500 |
| Shortening | 237 |
| NaCl | 19 |
| $NaHCO_3$ | 3 |
| Whole eggs | 300 |
| Sucrose | 200 |
| Powdered milk | 90 |
| Water | 600 |
| Vanilla | 12 |
| Flour | 500 |
| $KHC_4H_4O_6$ | 6 |
| $NaHCO_3$ | 12 |
| Chocolate | 238 |

The procedure for preparing the chocolate cake from the above formula is substantially similar to that described hereinabove for the sponge cake. The three groups of ingredients shown in Example II above, are mixed separately and are blended substantially in the order described hereinabove under Example I. The chocolate may be added last as indicated or it may be incorporated in the first group of ingredients.

One of the commercial advantages of my invention is in the tremendous reduction in cost of the bakery products as compared with those made by the usual procedures employing only sucrose or the like as the sugar ingredient. For example, due to the greater porosity and extensibility effects described above, whereby a substantially larger amount of air is incorporated in the cake, I have been able to reduce the amount of batter needed for each cake about 5% and at the same time produce an improvement in the grain and texture of the finished product. Considering a 100# batch of batter I obtain five more 1# cakes than can be obtained when sucrose alone is used. When this saving is applied to the large production of cakes now in quantities of millions, the tremendous saving in cost will be appreciated.

The claims herein are directed to a bakery composition for making leavened bakery products such as cakes of relatively large volume and containing relatively large amounts of sugar, as distinguished from the unleavened relatively thin bakery products such as pie crusts (which contain little or no sugar) claimed in applicant's copending application Serial No. 185,651 now Patent No. 2,172,211. The solidified starch conversion syrup when used in the compositions herein, which are subjected to substantial agitation or beating in the form of a batter, acts as a physical leavening agent by facilitating incorporation in the batter of large amounts of air and thereby reduces or even substantially eliminates the amount of usual chemical leavening agent required.

Various modifications and changes may be made in the foregoing disclosure without departing from the scope and spirit of my invention, some of the novel features of which are defined in the appended claims.

I claim:

1. A bakery composition for making leavened products and having a relatively high sugar content in proportion to the flour used and which upon leavening and baking produces a cake of relatively large volume and long keeping qualities comprising an intimate admixture of usual flour and sucrose together with a dried, solidified, starch conversion syrup composed essentially of dextrose, maltose and dextrins, said dextrose and maltose being present in an amount ranging from about 15% up to about 65%, said solidified starch conversion syrup having itself physical leavening properties adapted for imparting to the mixture a substantially greater capacity for forming an emulsion with air upon beating than sucrose alone and thereby markedly reducing the amount of usual leavening agent required and producing a product of relatively large volume and fine texture with cell walls of minimum thickness and relatively low specific gravity, said solidified syrup having the property of taking up a relatively small amount of moisture from the other cake ingredients and retaining that moisture such that the cake remains fresh over a markedly long period of time.

2. In a bakery composition for making leavened products and having a leavening agent and a high ratio of sugar to flour and which upon leavening and baking produces a cake of relatively large volume, light weight and smooth texture; a substantial amount of a solidified, dried starch conversion syrup containing substantially all of the products of conversion and having about 15% to 65% reducing sugars calculated as dextrose and the remainder principally dextrins, said solidified syrup having the property of emulsifying with relatively large volumes of air upon beating so that the amount of usual leavening agent required is substantially reduced or even eliminated, and said solidified syrup permitting a substantial increase in the amount of total sugars content in the bakery product without increasing the sweetness of said product.

3. A bakery composition as defined in claim 1 in which the combined amount of sucrose and solidified starch syrup present ranges between 120% to 200% of the amount of flour ingredient.

4. A bakery composition as defined in claim 1 in which the amount of solidified starch conversion syrup constitutes from about 5% to 100% of the total sugar content in the composition.

5. A bakery composition as defined in claim 1 in which the amount of solidified starch conversion syrup constituutes from about 10% to 50% of the total sugar content in the composition.

6. In a bakery composition for making leavened cakes by leavening and baking and containing sugar and flour the improvement comprising the presence therein of a substantial amount of dried, solidified, finely divided corn syrup, composed essentially of dextrose, maltose and dextrins, said dextrose and maltose being present in an amount ranging from about 15% up to about 65%, said solidified syrup being easily and uniformly miscible with the flour and sugar and has the property of imparting to the composition a markedly great capacity for emulsifying with air and thereby markedly reducing and in some instances eliminating entirely the amount of usual leavening agent required to produce a product of relatively large volume, and has the property of taking up and retaining moisture such that the freshness of the baked product produced from said composition is substantially prolonged.

7. A bakery composition prepared for making leavened cakes of relatively large volume and thin wall texture comprising a mixture of flour, sugar and a dried solidified starch conversion syrup having about 15% to 65% of maltose and dextrose and the remainder principally dextrins, said composition being adapted for mixing with any of the usual cake ingredients including shortening and a chemical leavening agent, said solidified syrup having itself physical leavening properties which impart to the composition such great ability for emulsifying with air that the usual chemical leavening agent may be substantially reduced in amount, and said solidified syrup having sufficient sweetness and nutritive properties to replace in part or entirely the usual amount of sucrose used in leavened cakes.

8. A bakery composition prepared for making leavened cakes of relatively large volume and thin wall texture comprising a mixture of flour, sucrose and a dried solidified starch conversion syrup in amount of about 5% to 100% of the weight of sucrose.

9. A bakery composition prepared for making leavened cakes of relatively large volume and thin wall texture comprising a mixture of flour, sucrose, shortening and a dried solidified starch conversion syrup in amount of about 5% to 100% of the weight of sucrose, the combined amount of sucrose and solidified syrup being substantially greater than the amount of flour.

ROBERT L. LLOYD.